3,129,220
STEROIDAL-PYRIMIDINE-PYRAZOLES
Pietro de Ruggieri and Carmelo Gandolfi, Milan, Italy, assignors to Ormonoterapia Richter S.p.A., Milan, Italy, a corporation of Italy
No Drawing. Filed Aug. 6, 1962, Ser. No. 214,847
Claims priority, application Italy Aug. 5, 1961
11 Claims. (Cl. 260—239.5)

The present invention relates to compounds of the general formula

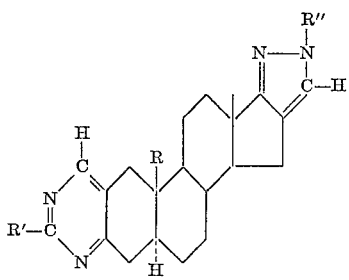

wherein R is a member selected from the group consisting of H and $CH_3$, R' is a member selected from the group consisting of H and $NH_2$ and R" is a member selected from the group consisting of H and $CH_3$ and intermediates employed in their preparation.

These compounds are useful therapeutic agents in the field of endocrinology as antihormones and for atheriosclerosis therapy.

As starting materials, there are employed compounds described in my copending applications Serial No. 150,666, filed November 7, 1961, and Serial No. 214,848, filed August 6, 1962. These compounds, 5α-androstane-3-one-[17,16-c]-pyrazole, 5α-androstane-3-one-[17,16-c]-(1' - methyl) - pyrazole, [2,3-d]-pyrimidine-5α-estrane-3-one, when treated with ethylformate and sodium methoxide or sodium hydride yield the corresponding α-hydroxymethylene compounds in position 2 or 16. The reaction of these latter compounds with hydrazine, methylhydrazine, guanidine, trisformyl-amino-methane yield the compounds of the above formula.

The following examples are set forth as illustrating but not as limiting the invention.

EXAMPLE NO. 1

*2-Hydroxymethylene-[17,16-c]-Pyrazole-5α-Androstane-3-One*

To a solution of 1.7 parts of 5α-androstane-3-one-(17,16-c)-pyrazole, in 100 parts of benzene under nitrogen atmosphere, were added with stirring 1.2 parts of sodium hydride and, at the end of 10 minutes, 4 parts of ethylformate. After 5 hours, the suspension was diluted with 80 parts of hexane and the precipitate was filtered, dried under vacuum and dissolved in water. The aqueous solution was adjusted with a saturated monobasic sodium phosphate solution to pH 4.5–5, and the so obtained precipitate was filtered, dried on a water-bath and crystallized from acetone to give 1.58 parts of 2-hydroxymethylene-[17,16-c]-pyrazole-5α-androstane-3-one; M.P. 248–250° C.; $[\alpha]_D = +60°$ (pyridine).

EXAMPLE NO. 2

*2-Hydroxymethylene-[17,16-c]-(1'-Methyl)-Pyrazole-5α-Androstane-3-One*

To a stirred solution of 1.6 parts of [17,16-c]-(1'-methyl)-pyrazole-5α-androstane-3-one in 75 parts of anhydrous benzene, under nitrogen atmosphere, were added 0.96 part of sodium hydride, and, after 10 minutes 3.2 parts of ethylformate. After 5 hours, the reaction mixture was diluted with 75 parts of hexane and the so obtained precipitate was filtered, dried under vacuum, and dissolved in water.

From the aqueous solution by acidifying with a saturated monobasic sodium phosphate solution, a crystalline product was obtained, which was filtered and recrystallized from methanol to yield 1.35 parts of 2-hydroxymethylene - [17,16 - c] - (1' - methyl)-pyrazole-5α-androstane-3-one; M.P. 224–226° C.; $[\alpha]_D = +66°$ (chloroform).

EXAMPLE NO. 3

*[3,2-d]-Pyrimidine-16-Hydroxymethylene-5α-Androstane-17-One*

To a stirred solution of 1.7 parts of [3,2-d]-pyrimidine-5α-androstane-17-one in 70 parts of anhydrous benzene, under nitrogen atmosphere, were added 1.2 parts of sodium hydride and after 10 minutes, 4 parts of ethylformate. The reaction mixture was diluted with 70 parts of petroleum ether, and the so obtained precipitate was filtered, dried under vacuum, and dissolved in water.

From the aqueous solution by acidifying with a saturated monobasic sodium phosphate solution, a crystalline product was obtained, which was filtered and crystallized from acetone to yield 1.54 parts of [3,2-d]-pyrimidine-16-hydroxymethylene-5α-androstane-17-one; M.P. 198–200° C.; $[\alpha]_D = +84°$ (chloroform).

EXAMPLE NO. 4

*[3,2-d]-Pyrimidine-16-Hydroxymethylene-5α-Estrane-17-One*

To a stirred solution of 0.5 part of [3,2-d]-pyrimidine-5α-estrane-17-one in 13 parts of anhydrous benzene, under nitrogen atmosphere, were added 0.3 part of sodium hydride, and, after 10 minutes, 1 part of ethylformate. After 5 hours, the suspension was extracted many times with water. From the aqueous fractions, after washing with 25 parts of ether and acidifying with a saturated monobasic sodium phosphate solution, a crystalline product was obtained which was filtered and crumbled in hot acetone to yield 0.4 part of [3,2-d]-pyrimidine-16-hydroxymethylene-5α-estrane-17-one; M.P. 244–246° C.; $[\alpha]_D = +170°$ (chloroform).

EXAMPLE NO. 5

*[3,2-d]-Pyrimidine-[17,16-c]-Pyrazole-5α-Androstane*

2 parts of [3,2-d]-pyrimidine-16-hydroxymethylene-5α-androstane-17-one dissolved in 25 parts of ethanol were refluxed for 1 hour together with 2 parts of 85% hydrazine hydrate. The solvent was removed under nitrogen atmosphere, and the residue was diluted with water and filtered to give, after crystallization from ether, 1.25 parts of [3,2-d]-pyrimidine-[17,16-c]-pyrazole-5α-androstane; M.P. 265–268° C.; $[\alpha]_D = +56°$ (chloroform).

EXAMPLE NO. 6

*[3,2-d]-Pyrimidine-[17,16-c]-Pyrazole-5α-Estrane*

3 parts of [3,2-d]-pyrimidine-16-hydroxymethylene-5α-estrane-17-one, 30 parts of ethanol and 3 parts of 85% hydrazine hydrate were refluxed for 1 hour. The solvent was then removed and the residue was diluted with water and filtered to give, after crystallization from acetone, 2.95 parts of [3,2-d]-pyrimidine-[17,16-c]-pyrazole-5α-estrane; M.P. >290° C.; $[\alpha]_D = +180°$ (chloroform).

EXAMPLE NO. 7

*[3,2-d]-Pyrimidine-[17,16-c]-(1'-Methyl)-Pyrazole-5α-Androstane*

1.5 parts of [3,2-d]-pyrimidine-16-hydroxymethylene-5α-androstane-17-one, 30 parts of ethanol and 30 parts of a 5% ethanol solution of methyl hydrazine were refluxed for 1 hour. The solvent was removed, and the residue was diluted with water and filtered to give, after crystallization from acetone, 1.23 parts of [3,2-d]-pyrimidine - [17,16 - c]-(1'-methyl)-pyrazole-5α-androstane; M.P. 213–215° C.; $[\alpha]_D = +55°$ (chloroform).

EXAMPLE NO. 8

[3,2-d]-Pyrimidine-[17,16-c]-(1'-Methyl)-Pyrazole-5α-Estrane 3 parts of [3,2-d]-pyrimidine-16-hydroxymethylene-5α-estrane-17-one in 30 parts of ethanol and 30 parts of a 5% ethanol solution of methylhydrazine were refluxed for 2 hours. The solvent was then removed and the residue was diluted with water, and filtered to give after crystallization from acetone, 2.6 parts of [3,2-d]-pyrimidine - [17,16 - d]-(1'-methyl)-pyrazole-5α-estrane; M.P. 253–258° C.; $[\alpha]_D = +125°$ (chloroform).

EXAMPLE NO. 9

[3,2-d]-(2'-Amino)-Pyrimidine-[17,16-c]-Pyrazole-5α-Androstane

To a solution of 2.9 parts of 2-hydroxymethylene-[17,16-c]-pyrazole-5α-androstane-3-one in 30 parts of ethanol were added 1.5 parts of guanidine hydrochloride followed by 1.320 parts of sodium bicarbonate. After refluxing for 20 hours the suspension was filtered and the crude product was refluxed for 10 minutes in 30 parts of water. The mixture was filtered to give after crystallization from methanol, 1.45 parts of [3,2-d]-(2'-amino)-pyrimidine - [17,16 - c] - pyrazole-5α-androstane; M.P. >290° C.; $[\alpha]_D = +50°$ (benzyl alcohol).

EXAMPLE NO. 10

[3,2-d]-(2'-Amino)-Pyrimidine-[17,16-c]-(1'-Methyl)-Pyrazole-5α-Androstane 0.5 part of 2-hydroxymethylene-[17,16-c]-(1'-methyl)-pyrazole-5α-androstane-3-one in 10 parts of ethanol, 0.25 part of guanidine hydrochloride and 0.2 part of sodium bicarbonate were refluxed for 20 hours. The precipitate so obtained was filtered, suspended in 20 parts of boiling water for 10 minutes, filtered and crystallized from chloroform, to give 0.22 part of [3,2-d]-(2'-amino)-pyrimidine-[17,16-c]-(1'-methyl)-pyrazole-5α-androstane; M.P. >290° C.; $[\alpha]_D = +59°$ (benzyl alcohol).

We claim:
1. A compound of the formula

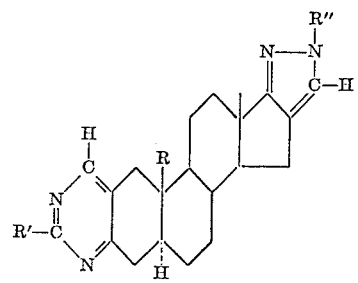

wherein R is a member selected from the group consisting of H and CH₃, R' is a member selected from the group consisting of H and NH₂ and R" is a member selected from the group consisting of H and CH₃.

2. 2 - hydroxymethylene-[17,16-c]-pyrazole-5α-androstane-3-one.

3. 2-hydroxymethylene - [17,16 - c]-(1'-methyl)-pyrazole-5α-androstane-3-one.

4. [3,2 - d] - pyrimidine - 16 - hydroxymethylene - 5α-androstane-17-one.

5. [3,2 - d] - pyrimidine - 16 - hydroxymethylene - 5α-estrane-17-one.

6. [3,2 - d] - pyrimidine - [17,16 - c] - pyrazole - 5α-androstane.

7. [3,2-d]-pyrimidine-[17,16-c]-pyrazole-5α-estrane.

8. [3,2 - d] - pyrimidine - [17,16 - c] - (1' - methyl)-pyrazole-5α-androstane.

9. [3,2 - d] - pyrimidine - [17,16 - c] - (1' - methyl)-pyrazole-5α-estrane.

10. [3,2 - d] - (2' - amino) - pyrimidine - [17,16 - c]-pyrazole-5α-androstane.

11. [3,2 - d] - (2' - amino) - pyrimidine - [17,16 - c]-(1'-methyl)pyrazole-5α-androstane.

References Cited in the file of this patent

UNITED STATES PATENTS

| | | |
|---|---|---|
| 2,999,092 | Colton et al. | Sept. 5, 1961 |
| 3,026,317 | Ringold et al. | Mar. 20, 1962 |